United States Patent
Cao et al.

(10) Patent No.: US 11,760,673 B2
(45) Date of Patent: Sep. 19, 2023

(54) TREATMENT METHOD OF WASTEWATER CONTAINING HETEROCYCLIC ORGANICS AND ADSORBING MATERIAL OBTAINED THEREFROM

(71) Applicant: Institute of Process Engineering, Chinese Academy of Sciences, Beijing (CN)

(72) Inventors: Hongbin Cao, Beijing (CN); Yongbing Xie, Beijing (CN); Linbi Zhou, Beijing (CN); Yanchun Shi, Beijing (CN)

(73) Assignee: INSTITUTE OF PROCESS ENGINEERING, CHINESE ACADEMY OF SCIENCES

( * ) Notice: Subject to any disclaimer, the term of this patent is extended or adjusted under 35 U.S.C. 154(b) by 984 days.

(21) Appl. No.: 16/424,796

(22) Filed: May 29, 2019

(65) Prior Publication Data
US 2019/0367397 A1    Dec. 5, 2019

(30) Foreign Application Priority Data

May 31, 2018    (CN) .......................... 201810547431.8

(51) Int. Cl.
*C02F 9/00*    (2023.01)
*B01J 20/30*    (2006.01)
(Continued)

(52) U.S. Cl.
CPC ............. *C02F 9/00* (2013.01); *B01J 20/3078* (2013.01); *C02F 1/004* (2013.01); *C02F 1/28* (2013.01);
(Continued)

(58) Field of Classification Search
None
See application file for complete search history.

(56) References Cited

U.S. PATENT DOCUMENTS 3,409,545 A * 11/1968 Albertson ................. C02F 3/02
                                                        210/906
4,141,829 A *  2/1979 Thiel ....................... C02F 11/08
                                                        210/762
(Continued)

FOREIGN PATENT DOCUMENTS

CN    101774678 A    7/2010
CN    103663666 A    3/2014
(Continued)

OTHER PUBLICATIONS

"Machine Translation of CN101774678", Chen, CN101774678, published 2010, 11 total pages) (Year: 2010).*
(Continued)

*Primary Examiner* — Jonathan M Peo
(74) *Attorney, Agent, or Firm* — McDonald Hopkins LLC (57) ABSTRACT

The present disclosure relates to a treatment method of wastewater containing heterocyclic organics comprising the following steps: (1) adding a persulfate to the wastewater containing heterocyclic organics in a reaction vessel; (2) heating the reaction vessel to a reaction temperature in an inert atmosphere, then introducing an oxygen-containing gas until a reaction pressure is reached for reaction, and after the reaction is completed, cooling and filtering the reaction resultant to obtain a filtrate as a treated effluent and a filter residue; no catalyst is added to the reaction system. The treatment method provided by the present disclosure not only can significantly reduce the treatment temperature of the conventional wet oxidation, but also can control the amount of generated spherical polymer and the removal efficiency of organic pollutants by control of reaction conditions. Wastewater purification and organics recovery and reuse are achieved at the same time.

14 Claims, 2 Drawing Sheets

(51) Int. Cl.
*C02F 101/38* (2006.01)
*C02F 1/72* (2023.01)
*C02F 1/28* (2023.01)
*C02F 1/00* (2023.01)
*C02F 1/74* (2023.01)

(52) U.S. Cl.
CPC ............... *C02F 1/727* (2013.01); *C02F 1/74* (2013.01); *C02F 2101/38* (2013.01); *C02F 2101/40* (2013.01); *C02F 2303/16* (2013.01)

(56) References Cited

U.S. PATENT DOCUMENTS

| | | | | |
|---|---|---|---|---|
| 2005/0077245 | A1* | 4/2005 | Blais | C02F 11/147 210/725 |
| 2006/0226083 | A1* | 10/2006 | Suzuki | C02F 1/5245 210/721 |
| 2011/0020199 | A1* | 1/2011 | Hemmings | C02F 1/283 106/710 |

FOREIGN PATENT DOCUMENTS

| | | |
|---|---|---|
| CN | 104743651 | 7/2015 |
| CN | 105084510 | 11/2015 |
| CN | 105174416 A | 12/2015 |
| GB | 2554606 A | 4/2018 |
| JP | 2018034086 A | 3/2018 |

OTHER PUBLICATIONS

"Machine Translation of JP2018034086", Sato et al., JP2018034086A, published Mar. 8, 2018, 15 total pages (Year: 2018).*

Chinese Office Action dated Apr. 23, 2020; Chinese Patent Application No. 201810547431.8.

* cited by examiner

TREATMENT METHOD OF WASTEWATER CONTAINING HETEROCYCLIC ORGANICS AND ADSORBING MATERIAL OBTAINED THEREFROM

CROSS-REFERENCE TO RELATED APPLICATIONS

This application claims priority to Chinese Patent Applications No. 201810547431.8, filed on May 31, 2018, published as Chinese Publication No. CN110550686 and published on Dec. 29, 2020, the contents of which are incorporated herein in its entirety by reference.

TECHNICAL FIELD

The present disclosure belongs to the technical field of water treatment, and particularly relates to a treatment method of wastewater containing heterocyclic organics and a resourcization preparation of a water treatment material.

BACKGROUND

Industrial wastewater is an important source of water pollution in China, which has the characteristics such as large emissions, complex composition and volatile water quality, resulting in high treatment costs and difficulty to meet emission standards. Generally, industrial wastewater contains a high concentration of pollutants, especially high concentration of aromatic compounds represented by polycyclic and heterocyclic pollutants, which are highly toxic and may significantly inhibit the biological activity during biodegradation, resulting in a great challenge to wastewater treatment. High-concentration toxic industrial wastewater treatment methods generally comprise: first reducing the chemical oxygen demand (COD) and biochemical oxygen demand (BOD) in the wastewater by pretreatment, and then advanced treatment by biological method or/and other advanced oxidation techniques. The pretreatment method includes extraction, rectification, oxidation and the like, wherein the extraction method can only remove organics with specific structures with high selectivity; the rectification method is mainly suitable for removal of organics with high volatility; and the oxidation method can degrade organics without selectivity. Among them, the ozone oxidation and Fenton oxidation are suitable for the degradation of low-concentration organics, while the wet oxidation method is suitable for the removal of high-concentration organics. The action principle of the wet oxidation method is to degrade organics by utilizing the active radicals generated during the reaction in which pure oxygen or air serves as an oxidant, under conditions of high temperature and high pressure.

The conventional wet oxidation method needs harsh reaction conditions, higher reaction temperature and pressure, and has a high requirement on temperature resistance, pressure bearing and corrosion resistance of the equipment, and results in a COD removal rate of generally lower than 80%. Although the addition of a catalyst can lower the reaction temperature, carbon catalysts are easily oxidized, and transitional metal catalysts may be dissolved to cause problems such as activity decrease and secondary pollution.

The activated persulfates produce sulfate radicals or hydroxyl radicals, which can oxidize most of the organics. However, persulfates per se are not very active, and the degradation efficiency of the treatment of wastewater by persulfates alone is low. The activation of persulfates generally requires high temperature, heterogeneous catalysts, or the addition of ultraviolet light, ultrasound to enhance the treatment effect. At present, there is a lack of high-activity metal catalyst for the activation of persulfates, and the catalyst is easily dissolved during the use to cause metal contamination, while the ultraviolet or ultrasonic technology has high processing costs and is suitable for treating low-concentration organic wastewater.

CN104743651A has disclosed a free radical-promoting catalytic wet oxidation degradation method for humic acid pollutants, comprising: adding a wastewater containing humic acid pollutants to an autoclave, and then adding a radical initiator and a catalyst, introducing oxygen or air into the autoclave for oxidative degradation of the humic acid pollutants under stirring conditions. Wherein the reaction temperature is set as 90-200° C., the total reaction pressure is 0.5-5 MPa and the partial pressure of oxygen is 0.1-3 MPa; the free radical initiator is hydrogen peroxide, a monopersulfate or a persulfate; and the catalyst is a modified activated carbon. This method has the disadvantages that the carbon catalyst is deactivated by oxidation, and cannot cope with the wastewater containing heterocyclic organics, especially the organic wastewater having a high COD.

CN105084510A has disclosed a method for removing algae in water based on a heat-activated oxidant, comprising the steps of: adding a solution containing the oxidant into the water containing algae for reaction, and sampling and analyzing the reaction resultant after heating to obtain values of algae activity, residual chlorophyll and algal metabolites, so as to determine the degree of algae removal in the water. Wherein, the alga is a pseudanabaena, the oxidant is a persulfate or a peroxymonosulfate, and the water containing algae has a density of $1.4 \times 10^7 - 1.9 \times 10^7$ cells/L. The method of this invention is carried out at a relatively low temperature (40-90° C.), showing weak oxidation ability. Although the algae removal effect is good, the efficiency is very low in treating high-concentration organic wastewater.

Hence, there exists an urgent need in the art to develop a novel treatment method for efficiently treating high-concentration toxic industrial wastewater, which can reduce energy consumption of the process, and improve the removal efficiency and utilization efficiency of organics.

SUMMARY

In view of the deficiencies of the existing technologies, the first object of the present disclosure is to provide a treatment method of wastewater containing heterocyclic organics, comprising the following steps:
(1) Adding a persulfate to the wastewater containing heterocyclic organics in a reaction vessel;
(2) Heating the reaction vessel to a reaction temperature in an inert atmosphere, then introducing an oxygen-containing gas until a reaction pressure is reached for reaction, and after the reaction is completed, cooling and filtering the reaction resultant to obtain a filtrate as a treated effluent and a filter residue as a polymer;
No catalyst is added to the reaction system.

The catalyst described in the present disclosure can be understood as a commonly added catalyst in the art for wet oxidation treatment of wastewater, such as transition metal ions, transition metal oxides, carbon materials, supported transition metal oxides, a supported noble metals, e.g. $Co^{2+}$, $Cu^{2+}$, $Fe^{2+}$, $Fe^{3+}$, $Mn^{2+}$, $Co_3O_4$, $CuO$, $Fe_2O_3$, $MnO_2$, activated carbon, carbon nanotube (CNT), reduced graphene oxide (rGO), $Co_3O_4$/rGO, Pt/rGO, Ag/CNT and the like.

Combining persulfate with the conventional wet oxidation technology so as to activate the persulfate by the higher temperature in the wet oxidation process, more active radicals are produced and the purpose of clean treatment of high-concentration organic wastewater is achieved. In addition, the treatment method provided by the present disclosure can also initiate radical polymerization of organics generated during the reaction to form solid polymers, which can be removed by separation and refabricated into functional materials for water treatment by heat treatment.

In the treatment method provided by the present disclosure, deep oxidative decomposition of the pollutants in the wastewater containing heterocyclic organics can be completed only in the presence of a persulfate without adding a catalyst, and at the same time, a high-molecular polymer can be formed by polymerization so that the purpose of deep resourcization treatment of high-concentration wastewater containing heterocyclic pollutants is achieved, and the problems of catalyst deactivation and secondary pollution of metal ions are avoided.

In an optional technical solution, the solid polymer is subjected to high-temperature calcination treatment and can be reused in wastewater treatment, so that it is expected to simultaneously achieve deep purification and resourcization recovery of high-concentration organic wastewater.

The addition of a persulfate during the wet oxidation treatment of wastewater allows the use of the sulfate radicals generated by heat activation to effectively promote the degradation of organics and thereby improve the efficiency of wastewater treatment and reduce the toxicity of wastewater. Therefore, the wastewater treatment method provided by the present disclosure not only treats high-concentration organic wastewater, but also reduces the reaction temperature and pressure required for the conventional wet oxidation, and at the same time solves the problem of secondary pollution that may be caused by the use of the catalyst.

Preferably, the wastewater containing heterocyclic organics has a COD of $1\times10^3$ mg/L or more, e.g. $2\times10^3$ mg/L, $4\times10^3$ mg/L, $6\times10^3$ mg/L, $7\times10^3$ mg/L, $9\times10^3$ mg/L, $1\times10^4$ mg/L, $3\times10^4$ mg/L, $5\times10^4$ mg/L, $7\times10^4$ mg/L, $9\times10^4$ mg/L and the like, preferably $1\times10^3$-$1\times10^5$ mg/L.

Preferably, in the wastewater containing heterocyclic organics, the content of the heterocyclic organics is 100 mg/L or more, e.g. 110 mg/L, 150 mg/L, 180 mg/L, 200 mg/L, 250 mg/L, 300 mg/L, 350 mg/L. 400 mg/L, 450 mg/L, 500 mg/L, 550 mg/L, 1000 mg/L, 1500 mg/L, 2000 mg/L, 3000 mg/L, 5000 mg/L or 7000 mg/L and the like.

The treatment method provided by the present disclosure can utilize the heat released by the degradation of high concentrated pollutants as part of the energy required for the reaction at the same time of the oxidative decomposition of pollutants, and can also realize the polymerization precipitation of the heterocyclic organics and the deep resourcization treatment of high concentrated wastewater.

Preferably, the heterocyclic organics include an aliphatic heterocyclic compound containing hetero atoms and an aromatic heterocyclic compound containing hetero atoms, and the hetero atoms include any one selected from the group consisting of a nitrogen atom, an oxygen atom, a sulfur atom, and a combination of at least two selected therefrom.

Illustratively, the heterocyclic organics include any one selected from the group consisting of furan, thiophene, pyrrole, thiazole, imidazole, pyridine, pyrazine, pyrimidine, pyridazine, indole, benzopyrazole, benzotriazole, benzothiazole, benzothiophene, benzimidazole, quinoline, pteridine, acridine, and a combination of at least two selected therefrom.

Preferably, the persulfate of the step (1) comprises any one selected from the group consisting of potassium persulfate, sodium persulfate, ammonium persulfate, potassium monopersulfate, sodium monopersulfate, ammonium monopersulfate, and a combination of at least two selected therefrom.

The persulfate may be added as a single persulfate, and may also be added as a composite salt of a monopersulfate with other salts to the system.

Illustratively, the potassium monopersulfate is exactly in a form of a composite salt, and the molecular formula of the potassium monopersulfate triple salt is represented by $2KHSO_5 \cdot KHSO_4 \cdot K_2SO_4$.

Preferably, the persulfate is added in the step (1) in a weight of 0.5-5.0 times the chemical oxygen demand (COD) in the wastewater, e.g. 1.0 time, 1.5 times, 2.0 times, 2.5 times, 3.0 times, 3.5 times, 4.0 times, 4.5 times and the like, preferably 1.0-2.0 times.

In the present disclosure, before the oxygen-containing gas is introduced into the reaction vessel, it is preferred to replace the internal gas of the reaction vessel to obtain an inert atmosphere, preferably, the reaction vessel is heated in prior to the introduction of the oxygen-containing gas.

Preferably, the reaction in the step (2) is performed at a temperature of 60-320° C., e.g. 70° C., 100° C., 120° C., 200° C., 270° C., 300° C. and the like, preferably 100-260° C.

Preferably, the reaction in the step (2) is performed at an oxygen partial pressure of 0.1-8.0 MPa, e.g. 0.5 MPa, 1.0 MPa, 2.0 MPa, 3.0 MPa, 4.0 MPa, 5.0 MPa, 6.0 MPa, 7.0 MPa and the like, preferably an oxygen partial pressure of 1.0-5.0 MPa, e.g. 2.0 MPa, 3.0 MPa, 4.0 MPa and the like.

Preferably, the reaction in the step (2) is performed for a time of 0.5-5 h, e.g. 1 h, 2 h, 3 h, 4 h and the like, preferably 1.0-3.0 h.

Preferably, the oxygen-containing gas in the step (2) comprises any one selected from the group consisting of air, oxygen, an industrial waste gas containing oxygen, and a combination of at least two selected therefrom.

Preferably, the reaction in the step (2) is assisted by agitation.

Preferably, the agitation rate is 10-1000 rpm, e.g. 20 rpm, 200 rpm, 400 rpm, 600 rpm, 800 rpm, 900 rpm and the like, preferably 100-300 rpm.

Illustratively, the wastewater treatment method provided by the present disclosure comprises the following steps:

(1) Taking a reaction vessel, firstly adding the wastewater containing heterocyclic organics to be treated to the reaction vessel, then adding a persulfate;

(2) Introducing a certain pressure of nitrogen, starting agitation, then heating the reaction vessel to a reaction temperature from room temperature; adding oxygen to a certain pressure and starting timing, and stopping the heating after a certain time period of reaction, and then discharging the pressure in the reaction vessel after the temperature is lowered to room temperature, obtaining a black suspension mixed liquid; after filtration, taking the clear liquid for an analysis of components and contents, washing repeatedly to obtain a black solid, then drying and weighing the black solid.

The second object of the present disclosure is to provide a method for preparing an adsorbing material from wastewater containing heterocyclic organics, wherein the adsorbing material is obtained by calcining the polymer obtained from the treatment method of wastewater containing heterocyclic organics according to the first object of the present disclosure in an inert atmosphere.

Preferably, the calcination temperature is 600-1200° C., e.g. 700° C., 800° C., 900° C., 1000° C., 1100° C. and the like.

Preferably, the calcination time is 2-4 h, e.g. 2.5 h, 3.0 h, 3.5 h, and the like.

The inert atmosphere may illustratively include any one selected from the group consisting of nitrogen, helium, argon, and a combination of at least two selected therefrom.

The third object of the present disclosure is to provide an adsorbing material obtained by the method according to the second object, which has a hollow spherical structure.

Preferably, the adsorbing material has an external diameter size distribution of 0.5-10 μm.

Preferably, the adsorbing material has a wall thickness size distribution of 50-200 nm;

The fourth object of the present disclosure is to provide a use of the adsorbing material according to the third object for adsorption treatment of wastewater.

Preferably, the adsorbing material is used for adsorption treatment of an organic wastewater.

The organics in the organic wastewater is not specifically limited herein, and may be any organics present in the wastewater, and exemplary examples include heterocyclic organics, aliphatic organics, organic acids, organic bases, esters, alcohols and the like.

The fifth object of the present disclosure is to provide a wastewater treatment method comprising immersing the adsorbing material according to the third object into a wastewater to be treated, and agitating for wastewater treatment.

Preferably, the adsorbing material is added in an amount of 0.5-10 g/L, e.g. 1.0 g/L, 1.5 g/L, 2.0 g/L, 2.5 g/L, 3.0 g/L, 3.5 g/L, 4.0 g/L, 4.5 g/L, 5.0 g/L, 5.5 g/L, 6.0 g/L, 6.5 g/L, 7.0 g/L, 7.5 g/L, 8.0 g/L, 8.5 g/L, 9.0 g/L, 9.5 g/L and the like.

Preferably, the wastewater treatment is performed at a temperature of 20-35° C., e.g. 25° C., 30° C. and the like.

Preferably, the agitation time is 2-12 h, e.g. 3 h, 4 h, 5 h, 7 h, 9 h, 10 h, 11 h and the like.

The sixth object of the present disclosure is to provide a treatment method of wastewater containing heterocyclic organics, comprising the following steps:
(1) Adding a persulfate to the wastewater containing heterocyclic organics in a reaction vessel;
(2) Heating the reaction vessel to a reaction temperature in an inert atmosphere, then introducing an oxygen-containing gas until a reaction pressure is reached for reaction, and after the reaction is completed, cooling and filtering the reaction resultant to obtain a filtrate as a treated effluent and a filter residue as a polymer;
(3) Calcining the filter residue of the step (2) in an inert atmosphere to obtain an adsorbing material;
(4) Immersing the adsorbing material obtained in the step (3) in an organic wastewater to adsorb and remove pollutants therein.

Preferably, the reaction conditions of the step (1) and the step (2) are the same as those of the treatment method of wastewater containing heterocyclic organics according to the first object.

Preferably, the reaction conditions of the step (3) are the same as that of the method for preparing an adsorbing material from wastewater containing heterocyclic organics according to the second object.

Preferably, the organic wastewater of the step (4) is the same as or different from the wastewater containing heterocyclic organics of the step (1).

Preferably, the adsorbing material is added for treating the organic wastewater in an amount of 0.5-10 g/L, e.g. 1.0 g/L, 1.5 g/L, 2.0 g/L, 2.5 g/L, 3.0 g/L, 3.5 g/L, 4.0 g/L, 4.5 g/L, 5.0 g/L, 5.5 g/L, 6.0 g/L, 6.5 g/L, 7.0 g/L, 7.5 g/L, 8.0 g/L, 8.5 g/L, 9.0 g/L, 9.5 g/L and the like.

As compared to the existing technologies, the present disclosure has the following beneficial effects:

(1) The present disclosure combines a persulfate with conventional wet oxidation technique without using a catalyst, and changes the sequence of the heating step and introduction of oxygen so as to partially polymerize the heterocyclic organics in the water into spheres for filtration and recycling, while the remaining part is oxidized into non-toxic carbon dioxide, water and a small amount of small-molecule organic acids, thereby achieving deep removal of toxic and harmful organics in the wastewater. The treatment method provided by the present disclosure can not only significantly reduce the reaction temperature and the dosage of the persulfate in the oxidation process, but also can control the amount of generated polymer and the removal efficiency of organic pollutants, at the same time achieving the purposes of wastewater purification treatment and organics recovery and reuse.

(2) The present disclosure provides a method for preparing a high-molecular polymer from wastewater containing heterocyclic organics. By coupling a persulfate and the wet oxidation method, the organics can be recovered from the highly concentrated organic wastewater and polymerized to form a hollow polymer, which can be reused in the wastewater treatment process, accordingly, this technology achieves the purpose of recycling and reusing organic resources in wastewater.

DETAILED DESCRIPTION

Enumerated below are some examples of the present disclosure in order to facilitate an understanding of the present disclosure. Those skilled in the art shall understand that the examples are set forth to aid in understanding the present disclosure and should not be regarded as specific limitations to the present disclosure.

Example 1

A treatment method of wastewater containing heterocyclic organics, wherein the wastewater is a formulated benzothiazole solution, comprising the following steps:
(1) 1.5 g of potassium persulfate and 500 mL of the benzothiazole solution (1 g/L, a COD of about 2400 mg/L) were added into a reaction kettle, and nitrogen was introduced into the kettle to replace the remaining oxygen therein; then agitation was conducted at a rate of 200 rpm, and the solution in the kettle was heated to 160° C. from room temperature, and then 4.0 MPa of oxygen was introduced. At this point, the timing was started, and after the reaction for 2 h, the agitation was stopped, and the solution in the kettle was rapidly cooled to room temperature to obtain a dark brown suspension liquid.

(2) The dark brown suspension liquid was separated by suction filtration, the COD concentration of the filtrate was determined to be 185 mg/L by potassium dichromate colorimetric method (HJ 828-2017 Water quality—Determination of the chemical oxygen demand—dichromate method), and the COD removal rate was calculated to be 92%.

(3) The filtered black solid was washed and dried repeatedly and then weighed to obtain 0.33 g of solid, and the recovery rate of organics was 66%.

The recovery rate of organics=(the weight of the black solid/the initial weight of the organics in the wastewater)× 100%.

Comparison Example 1-1

The difference from Example 1 is that no persulfate was added in step (1). By the same analysis method, the COD removal rate of Comparison Example 1-1 was measured to be only 67%, and no solid was formed.

Comparison Example 1-2

The difference from Example 1 is that oxygen was introduced before heating the solution in step (1), specifically comprising:

1.5 g of potassium persulfate and 500 mL of the benzothiazole solution (1 g/L) were added into a reaction kettle, and nitrogen was introduced into the kettle to replace the remaining oxygen therein; then 4.0 MPa of oxygen was introduced; thereafter, agitation was conducted at a rate of 200 rpm, and the solution in the kettle was heated to 160° C. from room temperature. At this point, the timing was started, and after the reaction for 2 h, the agitation was stopped, and the solution in the kettle was rapidly cooled to room temperature to obtain a clear liquid. By the same analysis method, the COD removal rate of Comparison Example 1-2 was measured to be 83%, and no solid was formed.

Example 2

A treatment method of wastewater containing heterocyclic organics, wherein the wastewater is a formulated benzothiazole solution, comprising the following steps:

(1) 1.5 g of sodium persulfate and 500 mL of the benzothiazole solution (1.5 g/L, a COD of about 3600 mg/L) were added into a reaction kettle, and nitrogen was introduced into the kettle to replace the remaining oxygen therein. Then agitation was conducted at a rate of 200 rpm, and the solution in the kettle was heated to 220° C. from room temperature, and then 6.0 MPa of oxygen was introduced. After the reaction for 2 h, the agitation was stopped, and the solution in the kettle was rapidly cooled to room temperature to obtain a dark brown suspension liquid.

(2) The dark brown suspension liquid was separated by suction filtration, the COD concentration of the filtrate was determined to be 180 mg/L, and the COD removal rate was calculated to be 95%.

(3) The filtered black solid was washed and dried repeatedly and then weighed to obtain 0.49 g of solid, and the recovery rate of organics was 67%.

Comparison Example 2

The difference from Example 2 is that no persulfate was added in step (1). By the same analysis method, the COD removal rate of Comparison Example 2 was measured to be only 72%, and no solid was formed.

Example 3

A treatment method of wastewater containing heterocyclic organics, wherein the wastewater is a formulated indole solution, comprising the following steps:

(1) 2.5 g of ammonium persulfate and 500 mL of the indole solution (1.5 g/L, a COD of about 4995 mg/L) were added into a reaction kettle, and nitrogen was introduced into the kettle to replace the remaining oxygen therein. Then agitation was conducted at a rate of 200 rpm, and the solution in the kettle was heated to 160° C. from room temperature, and then 4.0 MPa of oxygen was introduced. After the reaction for 2 h, the agitation was stopped, and the solution in the kettle was rapidly cooled to room temperature to obtain a dark brown suspension liquid.

(2) The dark brown suspension liquid was separated by suction filtration, the COD concentration of the filtrate was determined to be 890 mg/L, and the COD removal rate was calculated to be 81%.

(3) The filtered black solid was washed and dried repeatedly and then weighed to obtain 0.24 g of solid, and the recovery rate of organics was 33%.

Comparison Example 3

The difference from Example 3 is that no persulfate was added in step (1). By the same analysis method, the COD removal rate of Comparison Example 3 was measured to be only 46%, and no solid was formed.

Example 4

A treatment method of wastewater containing heterocyclic organics, wherein the wastewater is a formulated benzopyrazole solution, comprising the following steps:

(1) 5 g of potassium persulfate and 500 mL of the benzopyrazole solution (3 g/L, a COD of about 6880 mg/L) were added into a reaction kettle, and nitrogen was introduced into the kettle to replace the remaining oxygen therein. Then agitation was conducted at a rate of 200 rpm, and the solution in the kettle was heated to 200° C. from room temperature, and then 5.0 MPa of oxygen was introduced, and the timing was started at this point. After the reaction for 3 h, the agitation was stopped, and the solution in the kettle was rapidly cooled to room temperature to obtain a dark brown suspension liquid.

(2) The dark brown suspension liquid was separated by suction filtration, the COD concentration of the filtrate was determined to be 890 mg/L, and the COD removal rate was calculated to be 87%.

(3) The filtered black solid was washed and dried repeatedly and then weighed to obtain 0.12 g of solid, and the recovery rate of organics was 8%.

Comparison Example 4

The difference from Example 4 is that no persulfate was added in step (1). By the same analysis method, the COD removal rate of Comparison Example 4 was measured to be only 10%, and no solid was formed.

Example 5

A treatment method of wastewater containing heterocyclic organics, wherein the wastewater is a formulated benzotriazole solution, comprising the following steps:

(1) 1.5 g of potassium persulfate, 1.5 g of sodium persulfate, 1.5 g of ammonium persulfate and 500 mL of the benzotriazole solution (6 g/L, a COD of about 9240 mg/L) were added into a reaction kettle, and nitrogen was introduced into the kettle to replace the remaining oxygen therein; then agitation was conducted at a rate of 200 rpm, and the solution in the kettle was heated to 200° C. from room temperature, and then 5.0 MPa of oxygen was introduced. At this point, the timing was started, and after the reaction for 3 h, the agitation was stopped, and the solution in the kettle was rapidly cooled to room temperature to obtain a dark brown suspension liquid.

(2) The dark brown suspension liquid was separated by suction filtration, the COD concentration of the filtrate was determined to be 1250 mg/L, and the COD removal rate was calculated to be 84%.

(3) The filtered black solid was washed and dried repeatedly and then weighed to obtain 0.30 g of solid, and the recovery rate of organics was 20%.

Comparison Example 5

The difference from Example 5 is that no persulfate was added in step (1). By the same analysis method, the COD removal rate of Comparison Example 5 was measured to be only 30%, and no solid was formed.

Example 6

A treatment method of wastewater containing heterocyclic organics, wherein the wastewater is a formulated benzothiophene solution, comprising the following steps:

(1) 0.5 g of potassium monopersulfate triple salt (2KHSO$_5$·KHSO$_4$·K$_2$SO$_4$, having potassium monopersulfate as the main active ingredient) and 500 mL of the benzothiophene solution (0.1 g/L, a COD of about 210 mg/L) were added into a reaction kettle, and nitrogen was introduced into the kettle to replace the remaining oxygen therein; then agitation was conducted at a rate of 200 rpm, and the solution in the kettle was heated to 160° C. from room temperature, and then 0.1 MPa of oxygen was introduced. At this point, the timing was started, and after the reaction for 0.5 h, the agitation was stopped, and the solution in the kettle was rapidly cooled to room temperature to obtain a dark brown suspension liquid.

(2) The dark brown suspension liquid was separated by suction filtration, the COD concentration of the filtrate was determined to be 30 mg/L, and the COD removal rate was calculated to be 86%.

(3) The filtered black solid was washed and dried repeatedly and then weighed to obtain 0.008 g of solid, and the recovery rate of organics was 16%.

Comparison Example 6

The difference from Example 6 is that no persulfate was added in step (1).

By the same analysis method, the COD removal rate of Comparison Example 6 was measured to be only 47%, and no solid was formed.

Example 7

A treatment method of wastewater containing heterocyclic organics, wherein the wastewater is a formulated benzimidazole solution, comprising the following steps:

(1) 2.5 g of potassium persulfate, 2.5 g of sodium persulfate, 2.5 g of ammonium persulfate, 2.5 g of potassium monopersulfate triple salt (2KHSO$_5$·KHSO$_4$·K$_2$SO$_4$) and 500 mL of the benzimidazole solution (7 g/L, a COD of about 14925 mg/L) were added into a reaction kettle, and nitrogen was introduced into the kettle to replace the remaining oxygen therein. Then agitation was conducted at a rate of 200 rpm, and the solution in the kettle was heated to 320° C. from room temperature, and then 8.0 MPa of oxygen was introduced, and the timing was started at this point. After the reaction for 2 h, the agitation was stopped, and the solution in the kettle was rapidly cooled to room temperature to obtain a dark brown suspension liquid.

(2) The dark brown suspension liquid was separated by suction filtration, the COD concentration of the filtrate was determined to be 750 mg/L, and the COD removal rate was calculated to be 95%.

(3) The filtered black solid was washed and dried repeatedly and then weighed to obtain 0.02 g of solid, and the recovery rate of organics was 0.06%.

Comparison Example 7

The difference from Example 7 is that no persulfate was added in step (1). By the same analysis method, the COD removal rate of Comparison Example 7 was measured to be only 92%, and no solid was formed.

Example 8

A treatment method of wastewater containing heterocyclic organics, wherein the wastewater is a pharmaceutical industrial wastewater (mainly composed of benzothiazole, benzimidazole, benzothiophene, thiophene and its substitutes, etc), comprising the following steps:

(1) 7.5 g of sodium persulfate and 500 mL of the pharmaceutical wastewater (having a COD of about 21350 mg/L) were added into a reaction kettle, and nitrogen was introduced into the kettle to replace the remaining oxygen therein. Then agitation was conducted at a rate of 200 rpm, and the solution in the kettle was heated to 160° C. from room temperature, and then 4.0 MPa of oxygen was introduced. At this point, the timing was started, and after the reaction for 2 h, the agitation was stopped, and the solution in the kettle was rapidly cooled to room temperature to obtain a dark brown suspension liquid.

(2) The dark brown suspension liquid was separated by suction filtration, the COD concentration of the filtrate was determined to be 1250 mg/L, and the COD removal rate was calculated to be 94%.

(3) The filtered black solid was washed and dried repeatedly and then weighed to obtain 0.72 g of solid.

Comparison Example 8-1

The difference from Example 8 is that no persulfate was added in step (1). By the same analysis method, the COD removal rate of Comparison Example 8-1 was measured to be only 45%, and no solid was formed.

Comparison Example 8-2

The difference from Example 8 is that the oxygen was introduced before heating the solution in step (1), specifically comprising:

(1) 7.5 g of sodium persulfate and 500 mL of the pharmaceutical wastewater were added into a reaction kettle, and nitrogen was introduced into the kettle to replace the remaining oxygen therein, and then 4.0 MPa of oxygen was introduced. Then agitation at a rate of 200 rpm was conducted, and the solution in the kettle was heated to 160° C. from room temperature. At this point, the timing was started, and after the reaction for 2 h, the agitation was stopped, and the solution in the kettle was rapidly cooled to room temperature to obtain a dark brown suspension liquid.

By the same analysis method, the COD removal rate of Comparison Example 8-2 was measured to be 86%, and no solid was formed.

Application Examples 1-8

Figure 1:
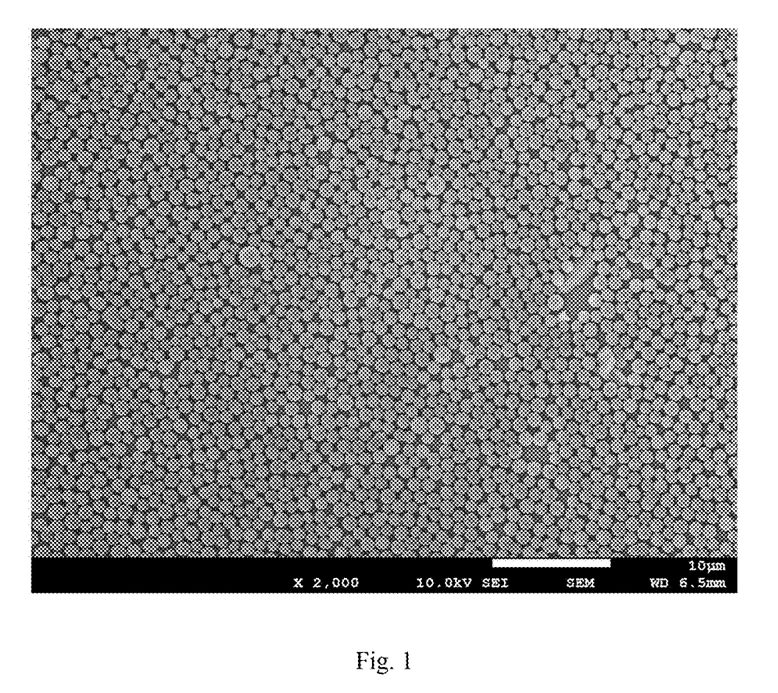
FIG. 1 is a SEM image of the adsorbing material described in Application Example 1 (magnified by 2000 times)
Figure 2:
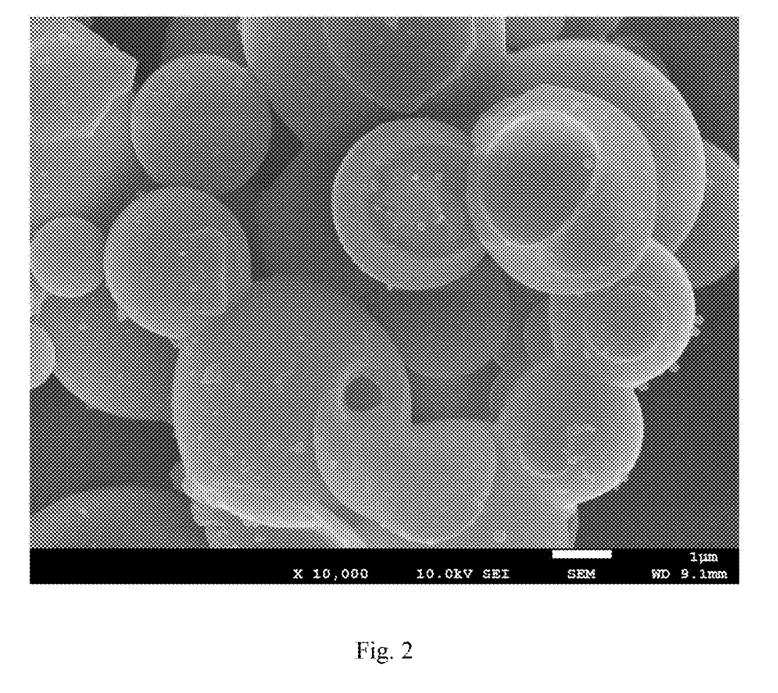
FIG. 2 is a SEM image of the adsorbing material described in Application Example 1 (magnified by 10000 times)

(1) The solids obtained in Examples 1-8 were respectively calcined in an inert atmosphere at 600° C. for 4 h to obtain carbonized adsorbing materials; and SEM images of the adsorbing material obtained from the calcination of the solid obtained in Example 1 have been given by FIG. 1 and FIG. 2;

(2) The adsorbing materials were immersed into a benzothiazole wastewater (having a COD of 500 mg/L) in an addition amount of 0.1 g/L, agitated at 20-35° C. for 10 h for wastewater treatment, and the COD concentration and COD removal of the treated water were determined.

Application Examples 9-16

(1) The solids obtained in Examples 1-8 were respectively calcined in an argon atmosphere at 1000° C. for 3 h to obtain carbonized adsorbing materials;

(2) The adsorbing materials were immersed into a benzothiazole wastewater (having a COD of 500 mg/L) in an addition amount of 0.5 g/L, agitated at 20-35° C. for 12 h for wastewater treatment, and the COD concentration and COD removal of the treated water were determined.

Application Examples 17-24

(1) The solids obtained in Examples 1-8 were calcined in an argon atmosphere at 1200° C. for 2 h to obtain carbonized adsorbing materials;

(2) The adsorbing materials were immersed into an actual wastewater containing benzotriazole, indole, thiophene, pyridine, etc. (having a COD of 2230 mg/L) in an addition amount of 10 g/L, agitated at 20-35° C. for 8 h for wastewater treatment, and the COD concentration and COD removal of the treated wastewater were determined.

Figure 3:
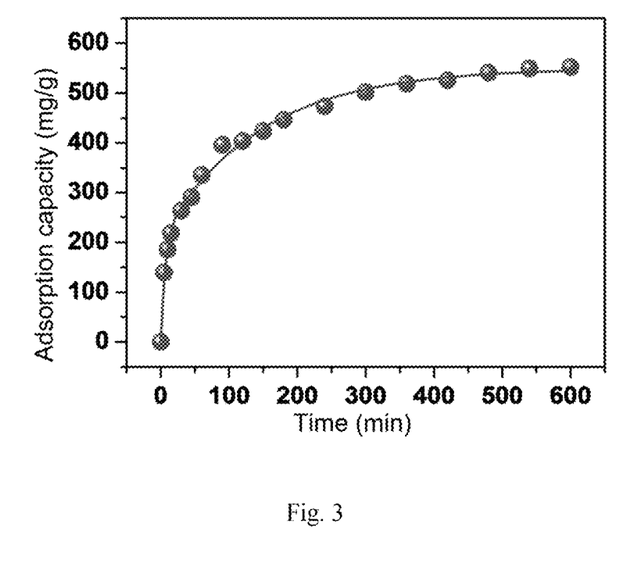
FIG. 3 is an adsorption effect diagram of the treatment of wastewater by the adsorbing material of Application Example 17.

The adsorption effect diagram of the treatment of wastewater by the adsorbing material of Application Example 17 has been given in FIG. 3.

The COD concentrations and COD removal rates of Application Examples 1-24 have been given in Table 1.

TABLE 1

| Samples | COD removal rates |
| --- | --- |
| Application Example 1 | 10.4% |
| Application Example 2 | 10.2% |
| Application Example 3 | 11.2% |
| Application Example 4 | 15.1% |
| Application Example 5 | 16.5% |
| Application Example 6 | 10.7% |
| Application Example 7 | 18.4% |
| Application Example 8 | 16.5% |
| Application Example 9 | 48.0% |
| Application Example 10 | 49.5% |
| Application Example 11 | 54.8% |
| Application Example 12 | 62.3% |
| Application Example 13 | 61.3% |
| Application Example 14 | 46.2% |
| Application Example 15 | 65.7% |
| Application Example 16 | 64.0% |
| Application Example 17 | 98.0% |
| Application Example 18 | 95.5% |
| Application Example 19 | 96.5% |
| Application Example 20 | 99.0% |
| Application Example 21 | 98.6% |
| Application Example 22 | 95.3% |
| Application Example 23 | 98.3% |
| Application Example 24 | 97.5% |

It can be seen from Table 1 that the treatment method of wastewater containing heterocyclic organics provided by the present disclosure can achieve an adsorbing material having adsorption effect while reducing the COD concentration, and the adsorption material has such marked adsorption effect on the pollutants in the wastewater that a usage amount of 0.1 g/L can result in adsorption of 10% or more of the organics in the simulated wastewater, and that a usage amount of 0.5 g/L can result in adsorption of 48% or more of the organics in the simulated wastewater, and that a usage amount of 10 g/L can result in adsorption of 95% or more of the organics in the simulated wastewater.

It can be seen from the test results of the above examples and Comparison examples that the treatment method provided by the present disclosure for treating wastewater, especially wastewater containing heterocyclic organics, can achieve a removal rate of COD in the wastewater of 80% or more, and can also collect the organics in the wastewater in the form of black hollow polymer particles which can be further used for adsorption treatment of wastewater. Of course, the polymer particles can also serve as a catalyst carrier, other adsorbent materials and the like. It can be clarified that in the method of the present disclosure, the heat treatment in prior to the introduction of oxygen can promote the conversion of heterocyclic organics to a polymer. When the oxygen is first introduced and then heated, no solid matter is formed.

What is claimed is:

1. A treatment method of wastewater containing heterocyclic organics, wherein the treatment method comprises the following steps:
   (1) adding a persulfate to the wastewater containing the heterocyclic organics in a reaction vessel;
   (2) heating the reaction vessel to a reaction temperature in an inert atmosphere, then introducing an oxygen-containing gas until a reaction pressure is reached for reaction, and after the reaction is completed, cooling and filtering a resultant of the reaction to obtain a filtrate as a treated effluent and a filter residue as a polymer; and
   no catalyst is added to a system of the reaction;

wherein the wastewater containing the heterocyclic organics has a COD of $2\times10^3$ mg/L-$1\times10^5$ mg/L;

wherein in the wastewater containing the heterocyclic organics, a content of the heterocyclic organics is 1500 mg/L-7000 mg/L;

a COD removal rate of the treated effluent is calculated to be 95%;

(3) calcining the filter residue of the step (2) in the inert atmosphere to obtain an adsorbing material;

wherein a calcination temperature is 900-1200° C.;

wherein the adsorbing material has a hollow spherical structure, the adsorbing material has an external diameter size distribution of 0.5-10 μm and the adsorbing material has a wall thickness size distribution of 50-200 nm.

2. The treatment method according to claim 1, wherein the heterocyclic organics include an aliphatic heterocyclic compound containing hetero atoms and an aromatic heterocyclic compound containing hetero atoms, and the hetero atoms include any one selected from the group consisting of a nitrogen atom, an oxygen atom, a sulfur atom and a combination of at least two selected therefrom.

3. The treatment method according to claim 1, wherein the persulfate of the step (1) comprises any one selected from the group consisting of potassium persulfate, sodium persulfate, ammonium persulfate, potassium monopersulfate, sodium monopersulfate, ammonium monopersulfate, and a combination of at least two selected therefrom.

4. The treatment method according to claim 1, wherein for 1 L of the wastewater, the persulfate is added in the step (1) in a weight of 0.5-5.0 times the chemical oxygen demand (COD) in the wastewater.

5. The treatment method according to claim 1, wherein the reaction in the step (2) is performed at a temperature of 60-320° C.

6. The treatment method according to claim 1, wherein the reaction in the step (2) is performed at an oxygen partial pressure of 0.1-8.0 MPa.

7. The treatment method according to claim 1, wherein the reaction in the step (2) is performed for a time of 0.5-5 h.

8. The treatment method according to claim 1, wherein the oxygen-containing gas in the step (2) comprises any one selected from the group consisting of air, oxygen, an industrial waste gas containing oxygen, and a combination of at least two selected therefrom.

9. The treatment method according to claim 1, wherein the reaction in the step (2) is assisted by agitation.

10. The treatment method according to claim 9, wherein a rate of the agitation is 10-1000 rpm.

11. The treatment method according to claim 1, wherein the treatment method further comprises the following steps:

(4) immersing the adsorbing material obtained in the step (3) in an organic wastewater to adsorb and remove pollutants therein.

12. The treatment method according to claim 11, wherein the organic wastewater of the step (4) is the same as or different from the wastewater containing the heterocyclic organics of the step (1).

13. The treatment method according to claim 11, wherein the adsorbing material is added for treating the organic wastewater with a dosage of 0.5-10 g/L in the organic wastewater.

14. The treatment method according to claim 1, wherein the calcination time is 2-4 h.

* * * * *